July 30, 1968     E. J. PISARZ     3,395,051

THERMOCOUPLE WITH JUNCTION BEAD COMPRESSIVELY SUPPORTED BY PLUG

Filed Nov. 8, 1962

*INVENTOR.*
EDWARD J. PISARZ

BY *Arthur H. Swenson*

ATTORNEY.

3,395,051
THERMOCOUPLE WITH JUNCTION BEAD COMPRESSIVELY SUPPORTED BY PLUG
Edward J. Pisarz, Williamstown, N.J., assignor to Honeywell Inc., a corporation of Delaware
Filed Nov. 8, 1962, Ser. No. 236,271
1 Claim. (Cl. 136—233)

This invention relates to thermocouples for quickly and accurately measuring relatively high temperatures.

It is an object of this invention to provide means for holding the hot junction of the thermocouple in a fixed position relative to the case or outer tube. There are two reasons for so holding the hot junction. One reason is that it is desired to accurately locate and retain the hot junction in the place at which the temperature is to be measured. The second reason is to provide a metal path by which the radiant energy whose temperature is to be measured is conducted to the hot junction of a thermocouple.

More specifically it is an object of this invention to provide a thermocouple hot junction which is held in position by means of a metal plug which has a tight fit with the thermocouple hot junction and a weld with the outer tube or casing.

A better understanding of the present invention may be had from the following detailed description when read in connection with the accompanying drawings, in which.

Figure 1:
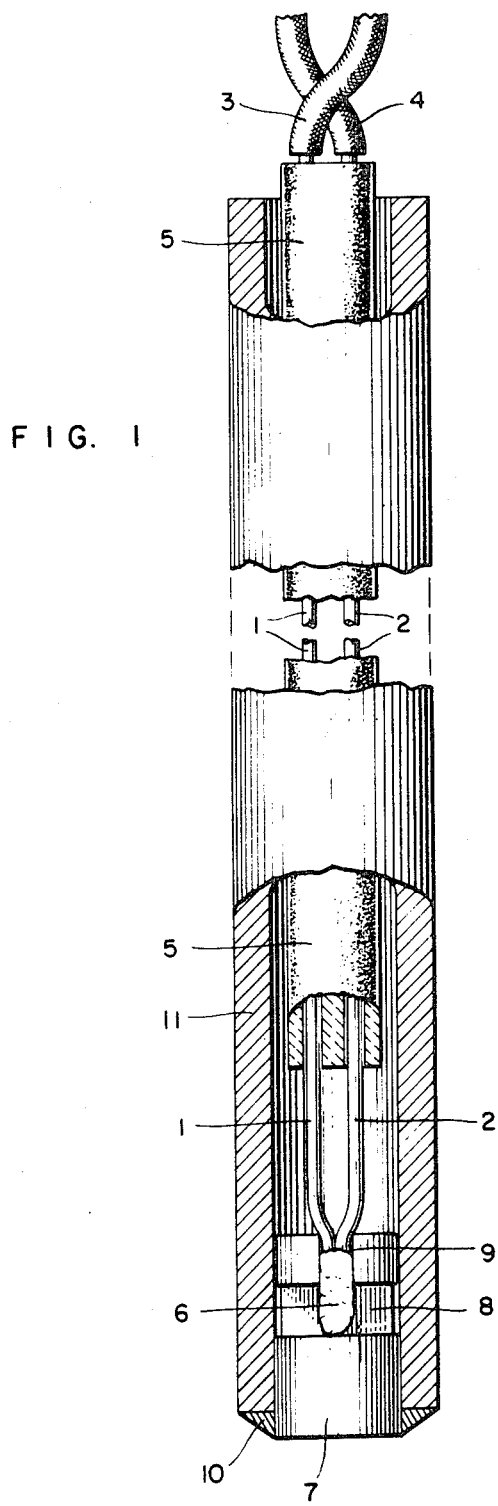
FIG. 1 is a view with parts broken away in longitudinal cross section.
Figure 2:
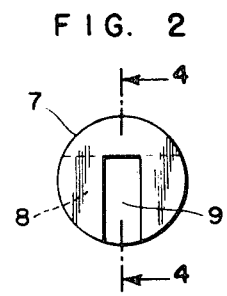
FIG. 2 is an end view of the plug.
Figure 3:
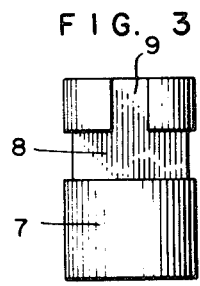
FIG. 3 is a side view of the plug.
Figure 4:
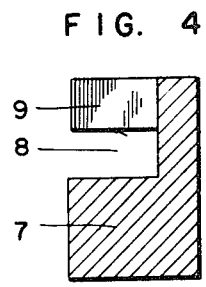
FIG. 4 is a longitudinal cross section on line 4—4 of FIG. 2 as viewed in the direction of the arrows.

The thermocouple of this invention comprises a pair of wires 1 and 2 each of a metallic composition different from the other, such as chromel and constantan. Wires 1 and 2 are insulated from each other, at a suitable distance from the hot junction, by a coating of neoprene and rubber applied to each of the wires. The bare wires 1 and 2 pass through holes in one or more ceramic insulators 5 which hold the wires 1 and 2 separate from each other. The ends of wires 1 and 2 are united into a bead 6 by fusible welding or other means. Bead 6 forms the hot junction of the thermocouple. The bead 6 resembles a butt weld. Wires 1 and 2 are not twisted together. In order to hold the hot junction in a definite location, a plug 7 of suitable metal is provided. The plug 7 has a transverse cut 8 and a longitudinal cut 9 in it. Longitudinal cut 9 only extends from one end of the plug 7 to the transverse slot 8. Hot junction 6 is filed, if necessary, to a tight fit in the slot 9 and placed therein. The sides of the slot 9 are then pinched tight onto the bead 6. Plug 7 is then placed in the end of an outer tube or casing 11, of stainless steel or the like, and united thereto, as by welding 10. Plug 7 provides a metallic path which conducts radiant energy, whose temperature is to be measured, to the hot junction 6. At the same time plug 7 holds the hot junction 6 in an exact location within the tube 11 so that the exact point of location of the hot junction 6 can be known and maintained so that the temperature is measured at the point desired.

What is claimed is:

1. A thermocouple, including a pair of wires each of a metallic material different from that of the other, a hot junction bead formed by uniting a portion of each of said wires with a portion of the other, said bead having side portions and a tip portion remote from said wires, a plug having a transverse slot, a longitudinal slot extending from one end of said plug and ending at said transverse slot, said bead extending through and in tight compressive physical surface-to-surface engagement with the walls defining said longitudinal slot such that said bead is in contact with an end wall surface of the plug, said end wall surface defining the surface of said transverse slot remote from said wires, said bead being solely compressively supported by said plug, and an outer case encircling said thermocouple wires and said plug and being connected by a thermal conducting material to said plug.

References Cited
UNITED STATES PATENTS

| | | | |
|---|---|---|---|
| 3,048,641 | 8/1962 | Erlebacher | 136—232 |
| 2,002,532 | 5/1935 | Flatley | 136—233 |
| 2,012,112 | 8/1935 | States | 136—229 X |
| 2,516,952 | 8/1950 | Bristol | 135—233 X |

OTHER REFERENCES

J 10,080, October 1956, Germany.

ALLEN B. CURTIS, *Primary Examiner.*

A. M. BEKELMAN, *Assistant Examiner.*